United States Patent [19]

Wike, Jr.

[11] Patent Number: 5,198,650
[45] Date of Patent: Mar. 30, 1993

[54] HANDS FREE/HAND HELD BAR CODE SCANNER

[75] Inventor: Charles K. Wike, Jr., Cambridge, Ohio

[73] Assignee: NCR Corporation, Dayton, Ohio

[21] Appl. No.: 720,109

[22] Filed: Jun. 24, 1991

[51] Int. Cl.⁵ .............................................. G06K 7/10
[52] U.S. Cl. ..................................................... 235/472
[58] Field of Search ........................... 235/467, 472; 248/206.5, 205.1; D14/116

[56] References Cited

U.S. PATENT DOCUMENTS

| | | | |
|---|---|---|---|
| D. 251,560 | 4/1979 | Smith et al. | D14/116 |
| D. 262,883 | 2/1982 | Sanner | D14/116 |
| D. 273,113 | 3/1984 | Knoll | D14/116 |
| D. 318,658 | 7/1991 | Stoddard, III et al. | D14/116 |
| 2,796,788 | 6/1959 | Bohn | 248/206.5 |
| 3,112,972 | 12/1963 | Fowler | 339/12 |
| 3,254,528 | 6/1966 | Michael | 73/74.1 |
| 3,713,614 | 1/1973 | Taylor | 248/205 A |
| 3,716,699 | 2/1973 | Eckert, Jr. et al. | 235/472 |
| 3,976,973 | 8/1976 | Martin et al. | 235/472 |
| 4,049,333 | 9/1977 | Wallace | 339/12 R |
| 4,358,661 | 11/1982 | Kaderabek | 219/230 |
| 4,418,277 | 11/1983 | Tremmel et al. | 235/472 |
| 4,471,218 | 9/1984 | Culp | 235/472 |
| 4,567,546 | 1/1986 | Zeller et al. | 361/420 |
| 4,672,515 | 6/1987 | Baker | 362/398 |
| 4,727,462 | 2/1988 | Komonko | 362/398 |
| 4,766,297 | 8/1988 | McMillan | 235/470 |
| 4,780,248 | 7/1988 | Swartz et al. | 235/467 |
| 4,939,356 | 7/1990 | Rando et al. | 235/467 |
| 4,983,818 | 1/1991 | Knowles | 235/467 |

FOREIGN PATENT DOCUMENTS

| | | | |
|---|---|---|---|
| 2269024 | 11/1975 | France | 248/206.5 |

Primary Examiner—Eugene R. LaRoche
Assistant Examiner—Michael C. Kessell
Attorney, Agent, or Firm—Richard W. Lavin

[57] ABSTRACT

A bar code scanner is disclosed comprising an egg-shaped housing member containing a scanning member which can be easily held by a checkout operator for a handheld scanning operation. A support member associated with the scanner has a vertically orientated support portion which has a magnet mounted in its end having a spherical-shaped mating surface which engages the correspondingly shaped surface of a magnet mounted to the under surface of the housing member enabling the scanner to be releasably supported on the support member in a plurality of scanning positions.

2 Claims, 3 Drawing Sheets

HANDS FREE/HAND HELD BAR CODE SCANNER

BACKGROUND OF THE INVENTION

This invention relates to laser bar code readers and more particularly to hand-held laser bar code readers.

Present check-out systems found in retail or supermarket stores include a point-of-sale terminal device positioned adjacent a check-out counter which includes an optical scanning device for scanning a bar code pattern on a label attached to a purchased merchandise item. The scanning device generates signals representing the coded data on the label which are used to generate the price of the purchased merchandise items. In some check-out systems, a hand-held bar code reader has been utilized where the purchased merchandise items can be easily handled by the check-out operator so as to position the reader adjacent the bar code label on the purchased merchandise item. Prior hand-held bar code readers have required that the operator use one hand to hold the reader while utilizing the other hand to hold the purchased merchandise item in a position allowing the reader to scan the coded label on the item. It would be desirable to have the hand-held reader mounted in such a manner as to enable the check-out operator to utilize both hands in moving the purchased merchandise items across the check-out counter while scanning the coded labels on the purchased merchandise items. It would further be desirable to have such a hand-held reader adapted to be grasped by the check-out operator to scan those bar code labels on a merchandise item which is easily handled by one hand of the operator. This arrangement allows the check-out operation to be completed in a minimal amount of time.

SUMMARY OF THE INVENTION

There is provided a bar code reader comprising an elongated egg-shaped housing member having a scanning unit mounted therein for projecting scanning light beams through a front portion of the housing member and a base member. The housing member includes a spherical shaped mounting portion which has mounted therein a magnet for engaging a magnet mounted in a post portion of the base member. The post portion extends in a vertical direction thereby positioning the bar code reader above the base member allowing the bar code reader to scan a coded label on a merchandise item moved past the front portion of the bar code reader by the operator utilizing both hands. The housing member is adapted to be grasped by the operator and removed from the post portion to function as a hand-held portable bar code reader for scanning a bar code label on a merchandise item that is moved past the housing member. The base member includes a printed circuit board on which is located the electronics for decoding the bar code data generated by the scanning operation of the bar code reader. The printed circuit board may be connected to the scanning unit by either a cable or a cableless communication system including a transceiver mounted in the base member. The base member is connected to a data terminal device by either a cable or by a cableless communication system utilizing transceivers located in the base member and in the terminal device.

It is therefore a principal object of this invention to provide a portable optical bar code reader which can be easily attached to a supporting member allowing the operator to move a purchased merchandise item past the bar code reader utilizing both hands.

It is another object of this invention to provide a hand-held bar code reader which can be easily employed in a hand-held operation or in a hands free operation.

It is another object of this invention to provide a hands-free/hands-held bar code reader which is simple in construction and low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
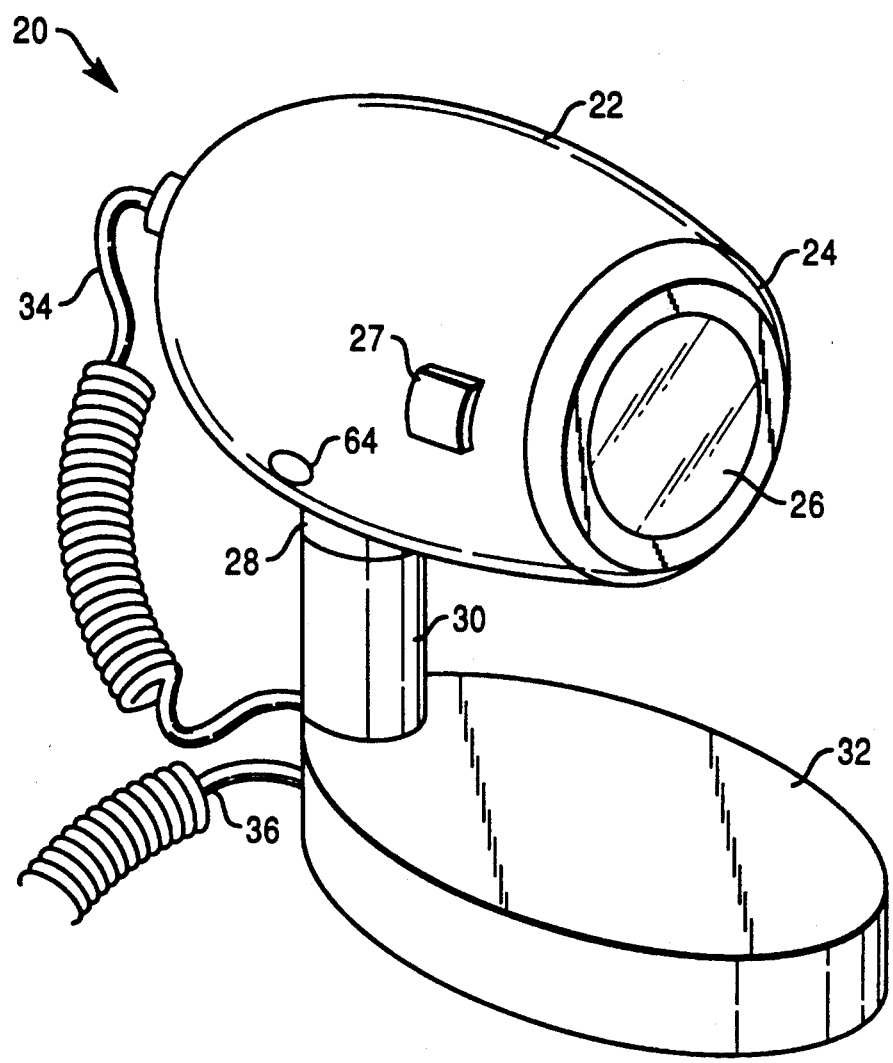
FIG. 1 is a perspective view of the optical bar code reader of the present invention shown mounted on a support base.
Figure 2:
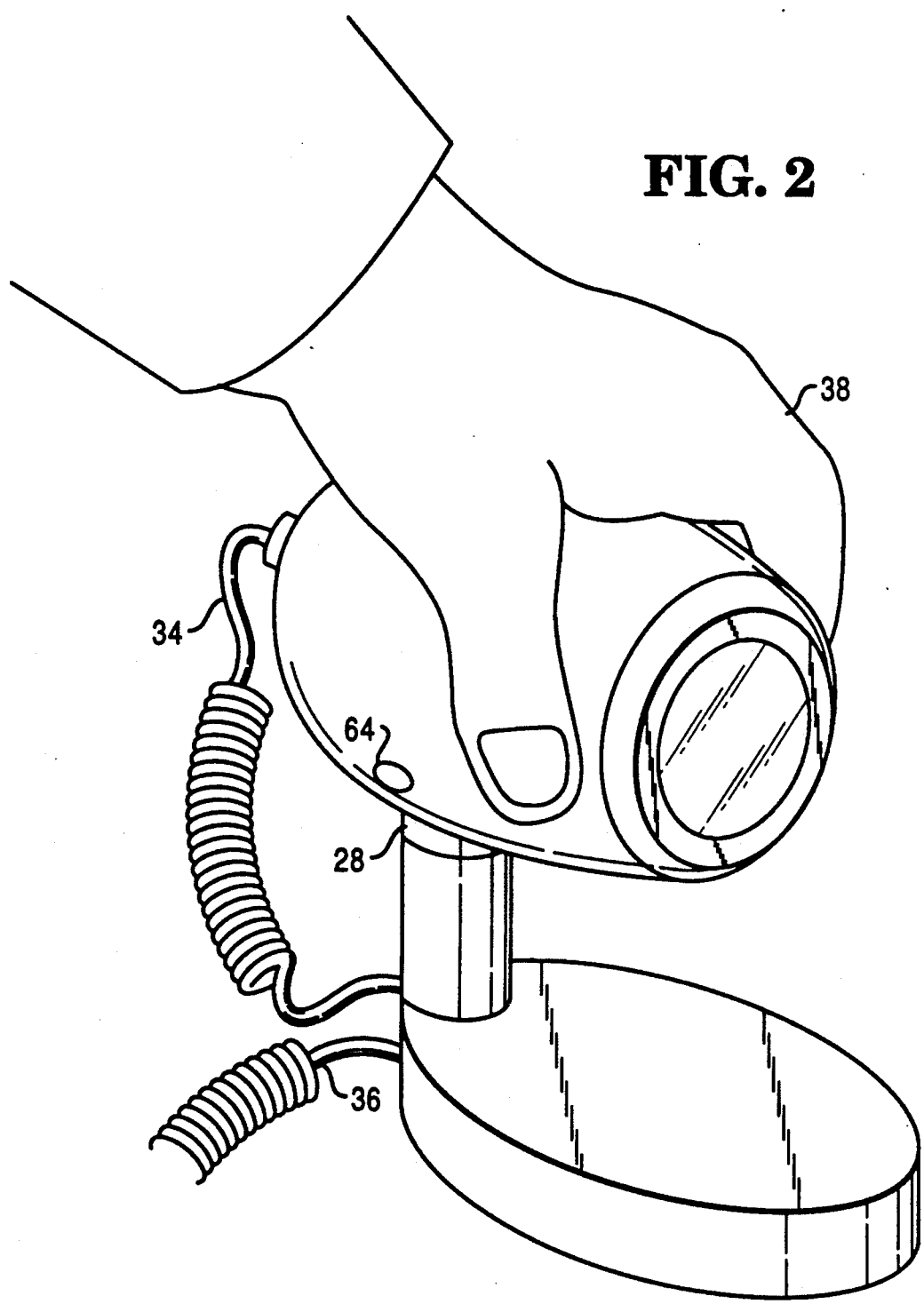
FIG. 2 is a perspective view of the bar code reader of the present invention showing the bar code reader being grasped by one hand of the check-out operator for use in a hand-held environment.

Referring now to FIG. 1, there is shown a perspective view of the optical bar code reader of the present invention generally indicated by the numeral 20 comprising an egg-shaped housing member 22 having a front portion 24 in which is mounted a glass substrate 26 through which scanning light beams are projected in a manner that will be described more fully hereinafter. The housing member 22 includes a support portion 28 which removably engages the post portion 30 of a base member 32 which extends in a vertical direction from the base member. As will be described more fully hereinafter, the support portion 28 of the bar code reader 20 is held in engagement with the post portion 30 by use of magnets mounted within the support portion 28 and the post portion 30. A cable member 34 connects the bar code reader 20 with the base member 32. A second cable member 36 extending from the rear of the base member 32 is connected to a data terminal device (not shown) for transmitting signals representing the data generated by the bar code reader 20 in scanning a bar code label. As shown in FIG. 2, the bar code reader is easily grasped by the hand 38 of the check-out operator to function as a hand-held scanner in which the bar code reader is moved past a bar code label attached to a purchased merchandise item.

Figure 3:
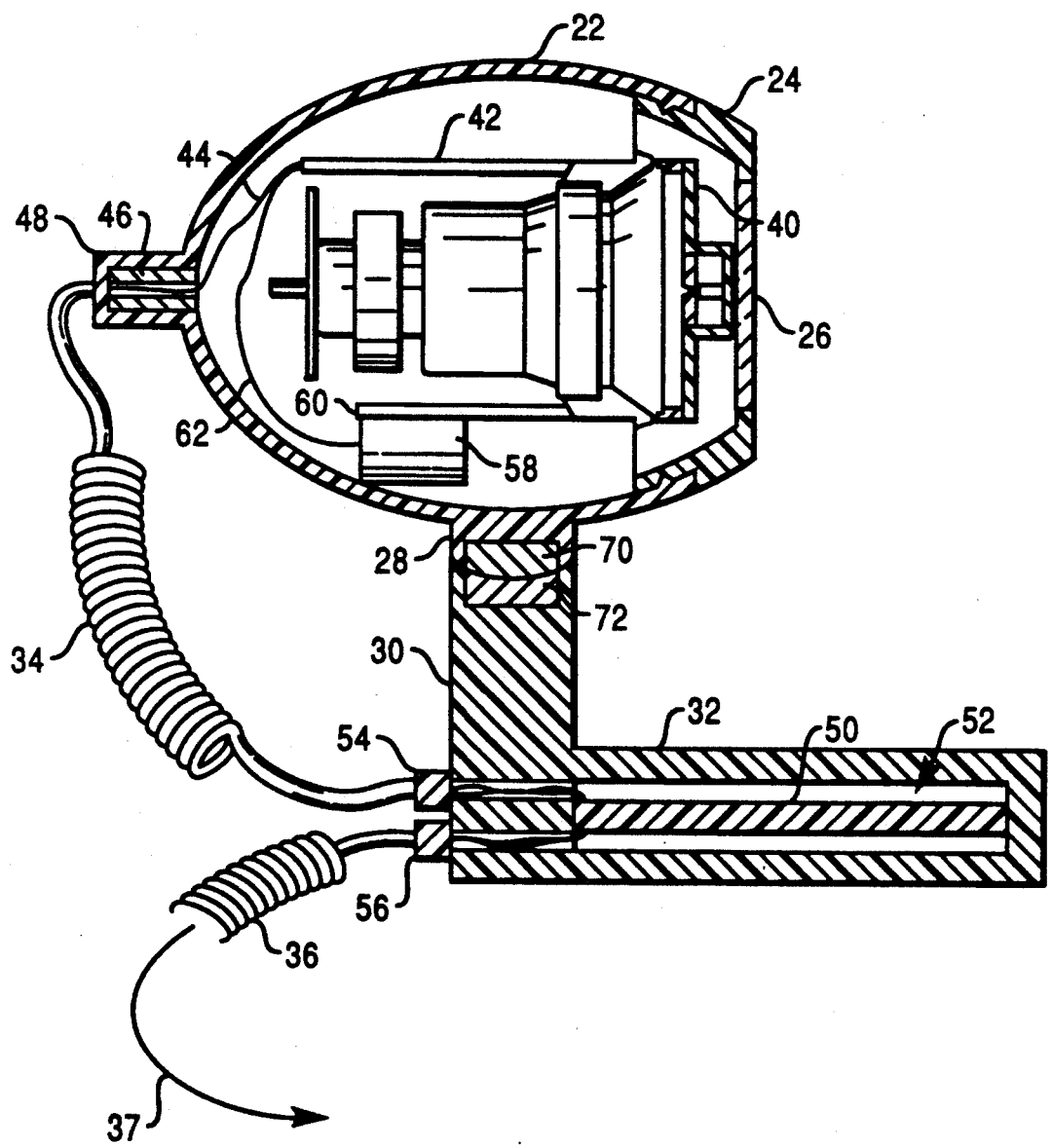
FIG. 3 is a side sectional view of the bar code reader and the base member showing the location of the adjacent mounted magnets for mounting the bar code reader onto the base member.

Referring now to FIG. 3, there is shown a side sectional view of the bar code reader 20 of the present invention and the base member 32. Mounted within the housing member 22 is a scanning module 40 which is fully disclosed in U.S. Pat. No. 4,971,410 which is assigned to the assignee of the present invention and which is fully incorporated herein by reference. The scanning module 40 will project scanning light beams through the glass substrate 26 when operated upon actuation of the switch member 27 (FIG. 1) by the check-out operator. Mounted to the scanning module 40 is a printed circuit board 42 containing the electronics for controlling the operation of the scanning module 40 in scanning a bar code label on a purchased merchandise item (not shown). The printed circuit board 42 is connected by wire 44 to a insertable plug member 46 mounted on a rear extension portion 48 of the housing member 22.

Located within the plug member 46 is one end of the cable 34 connected to the wire 44 for transmitting video signals from the bar code reader 20 to a printed circuit board 50 mounted within a recess portion 52 in the base member 32. The other end of the cable 34 is mounted within an insertable plug member 54 for connection to the printed circuit board 50. In a similar manner the cable 36 is positioned within an insertable plug member 56 for engagement with the printed circuit board 50. The other end of the cable may be connected to a remote data terminal device (not shown) as indicated by the arrow 37. In one embodiment of the present invention, power can be supplied to the optical bar code reader 20 through the cables 36 and 34. Where a cable-less transmission system is incorporated, a transceiver is mounted on the printed circuit board 42 in the optical bar code reader 20 and also on the printed circuit board 50 for enabling signals to be transmitted between the bar code reader and the base member 32. In this latter arrangement, the optical bar code reader 20 includes a battery member 58 mounted on a support member 60 for supplying power over wire 62 to the printed circuit board 42. A receptacle 64 (FIGS. 1 and 2) is mounted in the side of the housing member 22 for receiving a battery charger for charging the battery 58. The supporting portion 28 of the housing member 22 (FIG. 3) includes a magnet member 70 having a spherical shaped mating surface which when positioned on the post portion 30 will engage a similar shaped mating surface of a magnet member 72 or other type of magnetically attracted material mounted within the post portion 30.

It will be seen from this arrangement that positioning the bar code reader 20 on the post portion 30 of the base member 32 will enable the bar code reader 20 to be mounted in a free standing position allowing the scanning module 40 to scan a bar code label moved past the glass substrate 26 by the operator using both hands to hold the merchandise item. The reader 20 can be rotated when positioned on the post portion 30 to be orientated in a plurality of directions facilitating the scanning of a bar code label. When the occasion requires, the operator can grasp the bar code reader (FIG. 2) and remove it from the post portion for use in scanning a bar code label on a merchandise item in a manner that is well known in the art. The decoded signal generated by the electronics on the printed circuit board 50 will be transmitted over the cable 36 to the data terminal device from where the data is transmitted to a remote processor (not shown) for use in looking up the price of the merchandise item on which the scan bar code label is attached. This arrangement minimizes the time it takes for a scanning operations to occur.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

What is claimed is:

1. A system for scanning a bar code label comprising;
   an optical bar code reader having a generally eliptical shaped outer surface forming a housing member which is easily and completely grasped by the hand of an operator and includes an opening at one end of the bar code reader;
   a scanning assembly mounted in said optical bar code reader for projecting scanning light beams through said opening for scanning a coded label positioned adjacent the bar code reader;
   switch means mounted in said outer surface adjacent the opening for operating the scanning assembly when actuated by the hand of the operator while grasping the housing member;
   a vertically oriented support member; and
   magnetic releasable engaging means mounted in said support member and in said optical code reader having complementary mating surfaces for releasably holding the bar code reader in a plurality of free standing scanning positions which orientates the bar code reader around a horizontal axis in a general horizontal or vertical direction when the bar code reader is positioned on the support member allowing hands free scanning of a bar code label which is moved past the opening when the bar code label is either below or above the bar code reader, said releasable engaging means enabling the bar code reader to be easily removed from the support member for use as hand-held scanner in scanning a bar code label.

2. The combination of claim 1 in which said engaging means includes a first magnet member mounted in the bar code reader and a second magnet member mounted in the support member for engaging the first magnet member upon the positioning of the reader on the support member enabling the bar code reader to be supported by said support member in said plurality of free standing positions, said magnet members having corresponding spherical shaped mating surfaces enabling the bar code reader to be oriented in a plurality of generally horizontal and vertical scanning positions when positioned on the support member.

* * * * *